(12) United States Patent
Mun et al.

(10) Patent No.: US 11,001,646 B2
(45) Date of Patent: May 11, 2021

(54) MODIFIED CONJUGATED DIENE-BASED POLYMER AND RUBBER COMPOSITION INCLUDING THE SAME

(71) Applicant: LG Chem, Ltd., Seoul (KR)

(72) Inventors: Min Sik Mun, Daejeon (KR); Ro Mi Lee, Daejeon (KR); No Ma Kim, Daejeon (KR); Sun Keun Kim, Daejeon (KR); Youk Reol Na, Daejeon (KR); Heung Yeal Choi, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 16/338,817

(22) PCT Filed: Dec. 8, 2017

(86) PCT No.: PCT/KR2017/014419
§ 371 (c)(1),
(2) Date: Apr. 2, 2019

(87) PCT Pub. No.: WO2018/128288
PCT Pub. Date: Jul. 12, 2018

(65) Prior Publication Data
US 2019/0233547 A1    Aug. 1, 2019

(30) Foreign Application Priority Data

Jan. 3, 2017 (KR) .......... 10-2017-0000748
Jul. 31, 2017 (KR) .......... 10-2017-0097142

(51) Int. Cl.
*C08C 19/44* (2006.01)
*C08K 3/36* (2006.01)
(Continued)

(52) U.S. Cl.
CPC ............ *C08C 19/44* (2013.01); *B60C 1/0016* (2013.01); *C08F 236/10* (2013.01); *C08K 3/013* (2018.01);
(Continued)

(58) Field of Classification Search
None
See application file for complete search history.

(56) References Cited

U.S. PATENT DOCUMENTS 4,397,994 A  *  8/1983  Takeuchi ............... C08C 19/44
                                                 525/332.3
7,342,070 B2     3/2008  Tsukimawashi et al.
(Continued)

FOREIGN PATENT DOCUMENTS

CN    100347208 C    11/2007
CN    101495522 A    7/2009
(Continued)

OTHER PUBLICATIONS

Extended European Search Report for Application No. PCT/KR2017014419 dated Oct. 9, 2019, 2 pages.
(Continued)

*Primary Examiner* — Peter A Salamon
(74) *Attorney, Agent, or Firm* — Lerner, David, Littenberg, Krumholz & Mentlik, LLP (57) ABSTRACT

A modified conjugated diene-based polymer, and more particularly, a modified conjugated diene-based polymer having a unimodal molecular weight distribution curve measured by gel permeation chromatography (GPC), molecular weight distribution (PDI; MWD) of less than 1.7, and a Si content of 100 ppm or more based on weight, and including a repeating unit derived from an aromatic vinyl monomer in an amount of greater than 0 wt % and less than 15 wt %, and a rubber composition including the same.

20 Claims, 3 Drawing Sheets

(51) Int. Cl.
| | |
|---|---|
| *C08K 3/04* | (2006.01) |
| *C08K 3/013* | (2018.01) |
| *B60C 1/00* | (2006.01) |
| *C08K 5/548* | (2006.01) |
| *C08F 236/10* | (2006.01) |
| *C08K 5/00* | (2006.01) |
| *C08L 47/00* | (2006.01) |
| *C08F 2/00* | (2006.01) |

(52) U.S. Cl.
CPC ............... *C08K 3/04* (2013.01); *C08K 3/36* (2013.01); *C08K 5/0025* (2013.01); *C08K 5/548* (2013.01); *C08L 47/00* (2013.01); *C08F 2/001* (2013.01); *C08F 2500/02* (2013.01); *C08F 2500/03* (2013.01); *C08F 2500/21* (2013.01)

(56) References Cited

U.S. PATENT DOCUMENTS

| | | | | |
|---|---|---|---|---|
| 2004/0254301 | A1* | 12/2004 | Tsukimawashi | C08L 2666/02 525/271 |
| 2009/0203843 | A1 | 8/2009 | Fukuoka et al. | |
| 2010/0016508 | A1 | 1/2010 | Sasagawa et al. | |
| 2012/0108736 | A1 | 5/2012 | Chen et al. | |
| 2014/0371383 | A1* | 12/2014 | Hayata | C08F 8/42 524/548 |
| 2016/0355612 | A1* | 12/2016 | Chun | C08F 236/10 |
| 2017/0022298 | A1 | 1/2017 | Sohn et al. | |
| 2017/0137541 | A1* | 5/2017 | Anezaki | B60C 1/0016 |
| 2019/0233547 | A1* | 8/2019 | Mun | B60C 1/0016 |
| 2020/0223968 | A1* | 7/2020 | Sohn | C08L 9/06 |

FOREIGN PATENT DOCUMENTS

| | | |
|---|---|---|
| CN | 106029719 A | 10/2016 |
| CN | 106068286 A | 11/2016 |
| EP | 3059257 A1 | 8/2016 |
| EP | 3059258 A1 | 8/2016 |
| EP | 3059259 A1 | 8/2016 |
| EP | 3070105 A1 | 9/2016 |
| EP | 3093297 A1 | 11/2016 |
| EP | 3101036 A1 | 12/2016 |
| EP | 3106469 A1 | 12/2016 |
| JP | H06271706 A | 9/1994 |
| JP | 2016011334 A | 1/2016 |
| JP | 2016037543 A | 3/2016 |
| KR | 20090031933 A | 3/2009 |
| KR | 20150144130 A | 12/2015 |
| KR | 101600722 B1 | 3/2016 |
| KR | 20160140624 A | 12/2016 |
| RU | 2522568 C2 | 7/2014 |
| WO | 03029299 A1 | 4/2003 |
| WO | 2016093496 A1 | 6/2016 |

OTHER PUBLICATIONS

Search report from International Application No. PCT/KR2017/014419, dated Feb. 22, 2018.
Chinese Search Report for Application No. 201780066703.6 dated Jan. 6, 2021, 2 pages.
Russian Search Report for Application No. 2019112745, dated Feb. 5, 2021, 2 pages.

* cited by examiner

MODIFIED CONJUGATED DIENE-BASED POLYMER AND RUBBER COMPOSITION INCLUDING THE SAME

CROSS-REFERENCE TO RELATED APPLICATIONS

The present application is a national phase entry under 35 U.S.C. § 371 of International Application No. PCT/KR2017/014419, filed on Dec. 8, 2017, which claims priority from Korean Patent Application Nos. 10-2017-0000748, filed on Jan. 3, 2017, and 10-2017-0097142, filed on Jul. 31, 2017, the entire contents of which are incorporated herein by reference.

TECHNICAL FIELD

The present invention relates to a modified conjugated diene-based polymer, and more particularly, to a modified conjugated diene-based polymer which is prepared by continuous polymerization, and has excellent processability, narrow molecular weight distribution, and excellent physical properties, and a rubber composition including the same.

BACKGROUND ART

According to the recent demand for cars having a low fuel consumption ratio, a conjugated diene-based polymer having modulational stability represented by wet skid resistance as well as low rolling resistance, and excellent abrasion resistance and tensile properties is required as a rubber material for tires.

In order to reduce the rolling resistance of tires, there is a method of reducing hysteresis loss of vulcanized rubber, and rebound resilience at 50° C. to 80° C., tan δ, Goodrich heating, or the like is used as an evaluation index of the vulcanized rubber. That is, it is desirable to use a rubber material having high rebound resilience at the above temperature or a low tan δ value or Goodrich heating.

Natural rubbers, polyisoprene rubbers, or polybutadiene rubbers are known as rubber materials having low hysteresis loss, but these rubbers have a limitation of low wet skid resistance. Thus, recently, conjugated diene-based polymers or copolymers such as styrene-butadiene rubbers (hereinafter, referred to as "SBR") and butadiene rubbers (hereinafter, referred to as "BR"), are prepared by emulsion polymerization or solution polymerization to be used as rubbers for tires. Among these polymerization methods, the greatest advantage of the solution polymerization in comparison to the emulsion polymerization is that the vinyl structure content and the styrene content, which specify physical properties of the rubber, may be arbitrarily adjusted and its molecular weight and physical properties may be controlled by coupling or modification. Thus, the SBR prepared by the solution polymerization is widely used as a rubber material for tires because it is easy to change a structure of the finally prepared SBR or BR, and movement of chain terminals may be reduced and a coupling force with a filler such as silica and carbon black may be increased by coupling or modification of the chain terminals.

If the solution-polymerized SBR is used as the rubber material for tires, since a glass transition temperature of the rubber is increased by increasing the vinyl content in the SBR, physical properties such as running resistance and braking force, required for tires may be controlled, and fuel consumption may be reduced by appropriately adjusting the glass transition temperature. The solution-polymerized SBR is prepared by using an anionic polymerization initiator and is being used by coupling or modifying the chain terminals of the polymer thus formed using various modifiers. For example, U.S. Pat. No. 4,397,994 discloses a method of coupling active anions of the chain terminals of a polymer obtained by polymerizing styrene-butadiene using alkyllithium which is a monofunctional initiator in a non-polar solvent, using a coupling agent such as a tin compound.

Meanwhile, the polymerization of SBR or BR may be conducted by batch-type or continuous-type polymerization. According to the batch-type polymerization, the polymer thus prepared has narrow molecular weight distribution and merits in view of the improvement of physical properties, but there are problems with low productivity and deteriorated processability. According to the continuous-type polymerization, polymerization is continuously carried out and there are merits in view of excellent productivity and the improvement of processability, but there are problems with wide molecular weight distribution and inferior physical properties. Therefore, research on improving productivity, processability and physical properties at the same time during preparing SBR or BR is continuously required.

DISCLOSURE OF THE INVENTION

Technical Problem

The present invention has been devised to solve the above-mentioned problems of the conventional technique, and an object of the present invention is to provide a modified conjugated diene-based polymer having excellent processability due to continuous-type polymerization, good physical properties such as tensile properties, and excellent viscoelasticity, and a rubber composition including the same.

Technical Solution

To solve the above-described tasks, according to an embodiment of the present invention, there is provided a modified conjugated diene-based polymer having a unimodal molecular weight distribution curve measured by gel permeation chromatography (GPC), molecular weight distribution (PDI; MWD) of less than 1.7, and a Si content of 100 ppm or more based on a total weight of the modified conjugated diene-based polymer, and including a repeating unit derived from an aromatic vinyl monomer in an amount of greater than 0 wt % and less than 15 wt % based on a total weight of the modified conjugated diene-based polymer.

In addition, the present invention provides a rubber composition including the modified conjugated diene-based polymer and a filler.

Advantageous Effects

Since the modified conjugated diene-based polymer according to the present invention is prepared by continuous-type polymerization, processability is excellent, and narrow molecular weight distribution which is equal or higher than a modified conjugated diene-based polymer prepared by batch-type polymerization is achieved. Accordingly, physical properties such as tensile properties are good, and viscoelasticity properties are excellent.

BRIEF DESCRIPTION OF THE DRAWINGS

The accompanying drawings in the present disclosure illustrate preferred embodiments of the present invention

BEST MODE FOR CARRYING OUT THE INVENTION

Hereinafter, the present invention will be described in more detail in order to assist the understanding of the present invention.

It will be understood that words or terms used in the description and claims of the present invention shall not be interpreted as the meaning defined in commonly used dictionaries. It will be further understood that the words or terms should be interpreted as having a meaning that is consistent with their meaning of the technical idea of the invention, based on the principle that an inventor may properly define the meaning of the words or terms to best explain the invention.

The modified conjugated diene-based polymer according to the present invention has a unimodal molecular weight distribution curve measured by gel permeation chromatography (GPC), molecular weight distribution (PDI; MWD) of less than 1.7, and a Si content of 100 ppm or more based on a total weight of the modified conjugated diene-based polymer, and may include a repeating unit derived from an aromatic vinyl monomer in an amount of greater than 0 wt % to less than 15 wt % based on a total weight of the modified conjugated diene-based polymer.

According to an embodiment of the present invention, the modified conjugated diene-based polymer may include a repeating unit derived from a conjugated diene-based monomer and a functional group derived from a modifier. The repeating unit derived from a conjugated diene-based monomer may mean a repeating unit formed by a conjugated diene-based monomer during polymerization, and the functional group derived from a modifier may mean a functional group derived from a modifier which is present at one terminal of an active polymer via the reaction or coupling between the active polymer and the modifier.

According to an embodiment of the present invention, the conjugated diene-based monomer may be one or more selected from the group consisting of 1,3-butadiene, 2,3-dimethyl-1,3-butadiene, piperylene, 3-butyl-1,3-octadiene, isoprene, 2-phenyl-1,3-butadiene, and 2-halo-1,3-butadiene (halo means a halogen atom).

Meanwhile, the modified conjugated diene-based polymer may be a copolymer including a repeating unit derived from an aromatic vinyl monomer and may include the repeating unit derived from an aromatic vinyl monomer in an amount of greater than 0 wt % to less than 15 wt %. Within this range, effect of excellent balance between rolling resistance and wet skid resistance may be achieved.

The aromatic vinyl monomer may include, for example, one or more selected from the group consisting of styrene, α-methylstyrene, 3-methylstyrene, 4-methylstyrene, 4-propylstyrene, 1-vinylnaphthalene, 4-cyclohexylstyrene, 4-(p-methylphenyl)styrene, 1-vinyl-5-hexylnaphthalene, 3-(2-pyrrolidino ethyl)styrene, 4-(2-pyrrolidino ethyl)styrene, and 3-(2-pyrrolidino-1-methyl ethyl)-α-methylstyrene.

In another embodiment, the modified conjugated diene-based polymer may be a copolymer which further includes a repeating unit derived from a diene-based monomer of 1 to 10 carbon atoms together with the repeating unit derived from the conjugated diene-based monomer. The repeating unit derived from the diene-based monomer may be a repeating unit derived from a diene-based monomer which is different from the conjugated diene-based monomer, and the diene-based monomer which is different from the conjugated diene-based monomer may be, for example, 1,2-butadiene. If the modified conjugated diene-based polymer is a copolymer further including a diene-based monomer, the modified conjugated diene-based polymer may include the repeating unit derived from the diene-based monomer in an amount of greater than 0 wt % to 1 wt %, greater than 0 wt % to 0.1 wt %, greater than 0 wt % to 0.01 wt %, or greater than 0 wt % to 0.001 wt % based on a total weight of the modified conjugated diene-based polymer. Within this range, effect of preventing gel formation may be achieved.

According to an embodiment of the present invention, the copolymer may be a random copolymer, and in this case, effect of excellent balance between each of physical properties may be achieved. The random copolymer may mean the arrangement of repeating units forming a copolymer in disorder.

The modified conjugated diene-based polymer according to an embodiment of the present invention may have a number average molecular weight (Mn) of 1,000 g/mol to 2,000,000 g/mol, 10,000 g/mol to 1,000,000 g/mol, or 100,000 g/mol to 800,000 g/mol, and a weight average molecular weight (Mw) of 1,000 g/mol to 3,000,000 g/mol, 10,000 g/mol to 2,000,000 g/mol, or 100,000 g/mol to 2,000,000 g/mol, and within these ranges, effects of excellent rolling resistance and wet skid resistance may be achieved. In another embodiment, the modified conjugated diene-based polymer may have molecular weight distribution (PDI; MWD; Mw/Mn) of less than 1.7, 1.0 to less than 1.7, or 1.1 to less than 1.7, and within this range, effects of excellent tensile properties, viscoelasticity properties, and balance between each of physical properties may be achieved. At the same time, the modified conjugated diene-based polymer has a unimodal molecular weight distribution curve measured by gel permeation chromatography (GPC), which corresponds to molecular weight distribution shown by a polymer prepared by continuous-type polymerization and may indicate that the modified conjugated diene-based polymer has uniform properties. That is, the modified conjugated diene-based polymer according to an embodiment of the present invention is prepared by continuous-type polymerization, and thus, has a unimodal molecular weight distribution curve and molecular weight distribution of less than 1.7.

In another embodiment, the modified conjugated diene-based polymer may have a Si content of 100 ppm or more, 100 ppm to 10,000 ppm, or 100 ppm to 5,000 ppm based on weight, and within this range, a rubber composition including the modified conjugated diene-based polymer shows excellent mechanical properties such as tensile properties and viscoelasticity properties. The Si content may mean the amount of Si atoms present in the modified conjugated diene-based polymer. Meanwhile, the Si atom may be derived from a functional group derived from a modifier.

The Si content may be measured via, for example, an ICP analysis method, and may be measured by the ICP analysis method using an inductively coupled plasma optical emission spectroscopy (ICP-OES; Optima 7300DV). If the inductively coupled plasma optical emission spectroscopy is used, measurement may be performed by adding about 0.7 g of a specimen to a platinum (Pt) crucible, adding about 1 ml of concentrated sulfuric acid (98 wt %, electronic grade) thereto, heating at 300° C. for 3 hours, incinerating the specimen in an electrical furnace (Thermo Scientific, Lindberg Blue M) by the following program of steps 1 to 3:

1) step 1: initial temp 0° C., rate (temp/hr) 180° C./hr, temp (holdtime) 180° C. (1 hr),
2) step 2: initial temp 180° C., rate (temp/hr) 85° C./hr, temp (holdtime) 370° C. (2 hr), and
3) step 3: initial temp 370° C., rate (temp/hr) 47° C./hr, temp (holdtime) 510° C. (3 hr), adding 1 ml of concentrated nitric acid (48 wt %) and 20 μl of concentrated hydrofluoric acid (50 wt %) to a residue, sealing the platinum crucible and shaking for 30 minutes or more, adding 1 ml of boric acid to the specimen, storing at 0° C. for 2 hours or more, diluting in 30 ml ultrapure water, and performing incineration.

In another embodiment, the modified conjugated diene-based polymer has a unimodal molecular weight distribution of a polymer component having a molecular weight of 100,000 g/mol or more measured by gel permeation chromatography (GPC) with polystyrene as a standard for calculating molecular weight, molecular weight distribution (PDI; MWD) of 2.0 or less, a number average molecular weight (Mn) of 250,000 g/mol to 700,000 g/mol, a vinyl content of a butadiene unit of 20 mol % to 80 mol %, a Si content of 100 ppm or more based on a total weight of the modified conjugated diene-based polymer, and the content of a polymer component having a functional group of 50 wt % or more based on a total weight of the modified conjugated diene-based polymer, and may include a repeating unit derived from an aromatic vinyl monomer in an amount of greater than 0 wt % and less than 15 wt % based on a total weight of the modified conjugated diene-based polymer.

The modified conjugated diene-based polymer has a Mooney viscosity of 30 or more, 40 to 150, or 40 to 140 at 100° C., and within this range, effects of excellent processability and productivity may be achieved.

In addition, the modified conjugated diene-based polymer may have a vinyl content of 5 wt % or more, 10 wt % or less, or 10 wt % to 60 wt % based on a total weight of the modified conjugated diene-based polymer. Here, the vinyl content may mean the amount of not 1,4-added but 1,2-added conjugated diene-based monomer based on 100 wt % of a conjugated diene-based copolymer composed of a monomer having a vinyl group, and an aromatic vinyl-based monomer.

The modifier according to the present invention may be a modifier for modifying the terminals of a conjugated diene-based polymer, and particularly, may be a modifier having affinity with silica. The modifier having affinity with silica may mean a modifier containing a functional group having affinity with silica in a compound used as a modifier, and the functional group having affinity with silica may mean a functional group having excellent affinity with a filler, particularly, a silica-based filler, and is capable of making interaction between the silica-based filler and the functional group derived from the modifier.

The modifier may be, for example, an alkoxysilane-based modifier, particularly, an alkoxysilane-based modifier containing one or more heteroatoms including a nitrogen atom, an oxygen atom, and a sulfur atom. If the alkoxysilane-based modifier is used, via substitution reaction between an anionic active part positioned at one terminal of an active polymer and an alkoxy group of the alkoxysilane-based modifier, the one terminal of the active polymer may be modified in a bonding state with a silyl group, and accordingly, the affinity of a functional group derived from the modifier present at the one terminal of a modified conjugated diene-based polymer with an inorganic filler may be increased, and the mechanical properties of a rubber composition including the modified conjugated diene-based polymer may be improved. Also, if the alkoxysilane-based modifier contains a nitrogen atom, additional effects of increasing physical properties due to the nitrogen atom may be anticipated in addition to the effects derived from the silyl group.

According to an embodiment of the present invention, the modifier may include a compound represented by the following Formula 1:

[Formula 1]

In Formula 1, $R^1$ may be a single bond, or an alkylene group of 1 to 10 carbon atoms, $R^2$ and $R^3$ may be each independently an alkyl group of 1 to 10 carbon atoms, $R^4$ may be hydrogen, an alkyl group of 1 to 10 carbon atoms, a divalent, trivalent, or tetravalent alkylsilyl group which is substituted with an alkyl group of 1 to 10 carbon atoms, or a heterocycle of 2 to 10 carbon atoms, $R^{21}$ may be a single bond, an alkylene group of 1 to 10 carbon atoms, or —[$R^{42}$O]$_j$—, where $R^{42}$ may be an alkylene group of 1 to 10 carbon atoms, a and m may be each independently an integer selected from 1 to 3, n may be an integer of 0, 1 or 2, and j may be an integer selected from 1 to 30.

In a particular embodiment, in Formula 1, $R^1$ may be a single bond, or an alkylene group of 1 to 5 carbon atoms, $R^2$ and $R^3$ may be each independently hydrogen, an alkyl group of 1 to 5 carbon atoms, $R^4$ may be hydrogen, an alkyl group of 1 to 5 carbon atoms, a tetravalent alkylsilyl group which is substituted with an alkyl group of 1 to 5 carbon atoms, or a heterocycle of 2 to 5 carbon atoms, $R^{21}$ may be a single bond, an alkylene group of 1 to 5 carbon atoms, or —[$R^{42}$O]$_j$—, where $R^{42}$ may be an alkylene group of 1 to 5 carbon atoms, a may be an integer of 2 or 3, m may be an integer selected from 1 to 3, n may be an integer of 0, 1 or 2, where m+n=3 may be satisfied, and j may be an integer selected from 1 to 10.

In Formula 1, if $R^4$ is a heterocycle, the heterocycle may be unsubstituted or substituted with a trisubstituted alkoxysilyl group, and if the heterocycle is substituted with a trisubstituted alkoxysilyl group, the trisubstituted alkoxysilyl group may be substituted via the connection with the heterocycle by an alkylene group of 1 to 10 carbon atoms, and the trisubstituted alkoxysilyl group may mean an alkoxysilyl group which is substituted with an alkoxy group of 1 to 10 carbon atoms.

In a more particular embodiment, the compound represented by Formula 1 may be one selected from the group consisting of N,N-bis(3-(dimethoxy(methyl)silyl)propyl)-methyl-1-amine, N,N-bis(3-(diethoxy(methyl)silyl)propyl)-methyl-1-amine, N,N-bis(3-(trimethoxysilyl)propyl)-methyl-1-amine, N,N-bis(3-(triethoxysilyl)propyl)-methyl-1-amine, N,N-diethyl-3-(trimethoxysilyl)propan-1-amine, N,N-diethyl-3-(triethoxysilyl)propan-1-amine, tri(trimethoxysilyl)amine, tri-(3-(trimethoxysilyl)propyl)

amine, N,N-bis(3-(diethoxy(methyl)silyl)propyl)-1,1,1-trimethlysilanamine, N,N-bis(3-(1H-imidazol-1-yl)propyl)-(triethoxysilyl)methan-1-amine, N-(3-(1H-1,2,4-triazole-1-yl)propyl)-3-(trimethoxysilyl)-N-(3-trimethoxysilyl)propyl)propan-1-amine, 3-(trimethoxysilyl)-N-(3-(trimethoxysilyl)propyl)-N-(3-(1-(3-(trimethoxysilyl)propyl)-1H-1,2,4-triazol-3-yl)propyl)propan-1-amine, N,N-bis(2-(2-methoxyethoxy)ethyl)-3-(triethoxysilyl)propan-1-amine, N,N-bis(3-(triethoxysilyl)propyl)-2,5,8,11,14-pentaoxahexadecan-16-amine, N-(2,5,8,11,14-pentaoxahexadecan-16-yl)-N-(3-(triethoxysilyl)propyl)-2,5,8,11,14-pentaoxahexadecan-16-amine and N-(3,6,9,12-tetraoxahexadecyl)-N-(3-(triethoxysilyl)propyl)-3,6,9,12-tetraoxahexadecan-1-amine.

In another embodiment, the modifier may include a compound represented by the following Formula 2:

[Formula 2]

In Formula 2, $R^5$, $R^6$ and $R^9$ may be each independently an alkylene group of 1 to 10 carbon atoms, $R^7$, $R^8$, $R^{10}$ and $R^{11}$ may be each independently an alkyl group of 1 to 10 carbon atoms, $R^{12}$ may be hydrogen or an alkyl group of 1 to 10 carbon atoms, b and c may be each independently 0, 1, 2 or 3, where b+c≥1 may be satisfied, and A may be where $R^{13}$, $R^{14}$, $R^{15}$ and $R^{16}$ may be each independently hydrogen or an alkyl group of 1 to 10 carbon atoms.

In a particular embodiment, the compound represented by Formula 2 may be one selected from the group consisting of N-(3-(1H-imidazol-1-yl)propyl)-3-(triethoxysilyl)-N-(3-(triethoxysilyl)propyl)propan-1-amine and 3-(4,5-dihydro-1H-imidazol-1-yl)-N,N-bis(3-(triethoxysilyl)propyl)propan-1-amine.

In another embodiment, the modifier may include a compound represented by the following Formula 3:

[Formula 3]

In Formula 3, $A^1$ and $A^2$ may be each independently a divalent hydrocarbon group of 1 to 20 carbon atoms, which contains an oxygen atom or not, $R^{17}$ to $R^{20}$ may be each independently a monovalent hydrocarbon group of 1 to 20 carbon atoms, $L^1$ to $L^4$ may be each independently a divalent, trivalent, or tetravalent alkylsilyl group which is substituted with an alkyl group of 1 to 10 carbon atoms, or a monovalent hydrocarbon group of 1 to 20 carbon atoms, where $L^1$ and $L^2$, and $L^3$ and $L^4$ may be combined with each other to form a ring of 1 to 5 carbon atoms, and if $L^1$ and $L^2$, and $L^3$ and $L^4$ are combined with each other to form a ring, the ring thus formed may include one to three heteroatoms selected from the group consisting of N, O and S.

In a particular embodiment, in Formula 3, $A^1$ and $A^2$ may be each independently an alkylene group of 1 to 10 carbon atoms, $R^{17}$ to $R^{20}$ may be each independently an alkyl group of 1 to 10 carbon atoms, $L^1$ to $L^4$ may be each independently a tetravalent alkylsilyl group which is substituted with an alkyl group of 1 to 5 carbon atoms, or an alkyl group of 1 to carbon atoms, where $L^1$ and $L^2$, and $L^3$ and $L^4$ may be combined with each other to form a ring of 1 to 3 carbon atoms, and if $L^1$ and $L^2$, and $L^3$ and $L^4$ are combined with each other to form a ring, the ring thus formed may include one to three heteroatoms selected from the group consisting of N, O and S.

In a more particular embodiment, the compound represented by Formula 3 may be one selected from the group consisting of 3,3'-(1,1,3,3-tetramethoxydisiloxane-1,3-diyl)bis(N,N-dimethylpropan-1-amine, 3,3'-(1,1,3,3-tetraethoxydisiloxane-1,3-diyl)bis(N,N-dimethylpropan-1-amine), 3,3'-(1,1,3,3-tetrapropoxydisiloxane-1,3-diyl)bis(N,N-dimethylpropan-1-amine), 3,3'-(1,1,3,3-tetramethoxydisiloxane-1,3-diyl)bis(N,N-diethylpropan-1-amine), 3,3'-(1,1,3,3-tetramethoxydisiloxane-1,3-diyl)bis(N,N-dimpropylpropan-1-amine), 3,3'-(1,1,3,3-tetraethoxydisiloxane-1,3-diyl)bis(N,N-diethylpropan-1-amine), 3,3'-(1,1,3,3-tetrapropoxydisiloxane-1,3-diyl)bis(N,N-diethylpropan-1-amine), 3,3'-(1,1,3,3-tetraethoxydisiloxane-1,3-diyl)bis(N,N-dipropylpropan-1-amine), 3,3'-(1,1,3,3-tetrapropoxydisiloxane-1,3-diyl)bis(N,N-dipropylpropan-1-amine), 3,3'-(1,1,3,3-tetramethoxydisiloxane-1,3-diyl)bis(N,N-diethylmethan-1-amine), 3,3'-(1,1,3,3-tetraethoxydisiloxane-1,3-diyl)bis(N,N-diethylmethan-1-amine), 3,3'-(1,1,3,3-tetrapropoxydisiloxane-1,3-diyl)bis(N,N-diethylmethan-1-amine), 3,3'-(1,1,3,3-tetramethoxydisiloxane-1,3-diyl)bis(N,N-dimethylmethan-1-amine), 3,3'-(1,1,3,3-tetramethoxydisiloxane-1,3-diyl)bis(N,N-dipropylmethan-1-amine), 3,3'-(1,1,3,3-tetrapropoxydisiloxane-1,3-diyl)bis(N,N-dimethylmethan-1-amine), 3,3'-(1,1,3,3-tetrapropoxydisiloxane-1,3-diyl)bis(N,N-dipropylmethan-1-amine), 3,3'-(1,1,3,3-tetraethoxydisiloxane-1,3-diyl)bis(N,N-dimethylmethan-1-amine), 3,3'-(1,1,3,3-tetraethoxydisiloxane-1,3-diyl)bis(N,N-dipropylmethan-1-amine), N,N'-((1,1,3,3-tetramethoxydisiloxane-1,3-diyl)bis(propan-3,1-diyl))bis(1,1,1-trimethyl-N-(trimethylsilyl)silanamine, N,N'-((1,1,3,3-tetraethoxydisiloxane-1,3-diyl)bis(propan-3,1-diyl))bis(1,1,1-trimethyl-N-(trimethylsilyl)silanamine, N,N'-((1,1,3,3-tetrapropoxydisiloxane-1,3-diyl)bis(propan-3,1-diyl))bis(1,1,1-trimethyl-N-(trimethylsilyl)silanamine, N,N'-((1,1,3,3-tetramethoxydisiloxane-1,3-diyl)bis(propan-3,1-diyl))bis(1,1,1-trimethyl-N-phenylsilanamine, N,N'-((1,1,3,3-tetraethoxydisiloxane-1,3-diyl)bis(propan-3,1-diyl))bis(1,1,1-trimethyl-N-phenylsilanamine, N,N'-((1,1,3,3-tetrapropoxydisiloxane-1,3-diyl)bis(propan-3,1-diyl))bis(1,1,1-trimethyl-N-phenylsilanamine, 1,3-bis(3-(1H-imidazol-1-yl)propyl)-1,1,3,3-tetramethoxydisiloxane, 1,3-bis(3-(1H-imidazol-1-yl)propyl)-1,1,3,3-tetraethoxydisiloxane, and 1,3-bis(3-(1H-imidazol-1-yl)propyl)-1,1,3,3-tetrapropoxydisiloxane.

In another embodiment, the modifier may include a compound represented by the following Formula 4:

[Formula 4]

In Formula 4, $R^{22}$ and $R^{23}$ may be each independently an alkylene group of 1 to 20 carbon atoms, or —$R^{28}[OR^{29}]_f$—, $R^{24}$ to $R^{27}$ may be each independently an alkyl group of 1 to 20 carbon atoms or an aryl group of 6 to 20 carbon atoms, $R^{28}$ and $R^{29}$ may be each independently an alkylene group of 1 to carbon atoms, $R^{47}$ and $R^{48}$ may be each independently a divalent hydrocarbon group of 1 to 6 carbon atoms, d and e may be each independently 0, or an integer selected from 1 to 3, where d+e may be an integer of 1 or more, and f may be an integer of 1 to 30.

Particularly, in Formula 4, $R^{22}$ and $R^{23}$ may be each independently an alkylene group of 1 to 10 carbon atoms, or —$R^{28}[OR^{29}]_f$—, $R^{24}$ to $R^{27}$ may be each independently an alkyl group of 1 to 10 carbon atoms, $R^{28}$ and $R^{29}$ may be each independently an alkylene group of 1 to 10 carbon atoms, d and e may be each independently 0, or an integer selected from 1 to 3, where d+e may be an integer of 1 or more, and f may be an integer of 1 to 30.

More particularly, the compound represented by Formula 4 may be a compound represented by the following Formula 4a, Formula 4b, or Formula 4c:

[Formula 4a]

[Formula 4b]

[Formula 4c]

In Formula 4a, Formula 4b and Formula 4c, $R^{22}$ to $R^{27}$, e and e are the same as described above.

In a more particular embodiment, the compound represented by Formula 4 may be one selected from the group consisting of 1,4-bis(3-(3-(triethoxysilyl)propoxy)propyl)piperazine, 1,4-bis(3-(triethoxysilyl)propyl)piperazine, 1,4-bis(3-(trimethoxysilyl)propyl)piperazine, 1,4-bis(3-(dimethoxymethylsilyl)propyl)piperazine, 1-(3-(ethoxydimethlylsilyl)propyl)-4-(3-(triethoxysilyl)propyl)piperazine, 1-(3-(ethoxydimethyl)propyl)-4-(3-(triethoxysilyl)methyl)piperazine, 1-(3-(ethoxydimethyl)methyl)-4-(3-(triethoxysilyl)propyl)piperazine, 1,3-bis(3-(triethoxysilyl)propyl)imidazolidine, 1,3-bis(3-(dimethoxyethylsilyl)propyl)imidazolidine, 1,3-bis(3-(trimethoxysilyl)propyl)hexahydropyrimidine, 1,3-bis(3-(triethoxysilyl)propyl)hexahydropyrimidine and 1,3-bis(3-(tributoxysilyl)propyl)-1,2,3,4-tetrahydropyrimidine.

In another embodiment, the modifier may include a compound represented by the following Formula 5:

[Formula 5]

In Formula 5, $R^{3o}$ may be a monovalent hydrocarbon group of 1 to 30 carbon atoms, $R^{31}$ to $R^{33}$ may be each independently an alkylene group of 1 to 10 carbon atoms, $R^{34}$ to $R^{37}$ may be each independently an alkyl group of 1 to 10 carbon atoms, and g and h may be each independently 0, or an integer selected from 1 to 3, where g+h may be an integer of 1 or more.

In another embodiment, the modifier may include a compound represented by the following Formula 6:

[Formula 6]

In Formula 6, $A^3$ and $A^4$ may be each independently an alkylene group of 1 to 10 carbon atoms, $R^{38}$ to $R^{41}$ may be each independently an alkyl group of 1 to 10 carbon atoms, or an alkoxy group of 1 to 10 carbon atoms, and i may be an integer selected from 1 to 30.

In another embodiment, the modifier may include one or more selected from the group consisting of 3,4-bis(2-methoxyethoxy)-N-(4-(trimethylsilyl)butyl)aniline, N,N-diethyl-3-(7-methyl-3,6,8,11-tetraoxa-7-silatridecan-7-yl)propan-1-amine, 2,4-bis(2-methoxyethoxy)-6-((trimethylsilyl)methyl)-1,3,5-triazine and 3,14-dimethoxy-3,8,8,13-tetramethyl-2,14-dioxa-7,9-dithia-3,8,13-trisilapentadecane.

In another embodiment, the modifier may include a compound represented by the following Formula 7:

$(R^{43})_{4-k}Sn(-S-R^{44}-Si(OR^{45})_l(R^{46})_{3-l})_k$      [Formula 7]

In Formula 7, $R^{43}$, $R^{45}$ and $R^{46}$ may be each independently an alkyl group of 1 to 10 carbon atoms, $R^{44}$ may be an alkylene group of 1 to 10 carbon atoms, and k may be an integer selected from 1 to 4.

In a more particular embodiment, the compound represented by Formula 7 may be one selected from the group consisting of 8,8-dibutyl-3,13-dimethoxy-3,13-dimethyl-2,14-dioxa-7,9-dithia-3,13-disila-8-stannapentadecane, 8,8-dimethyl-3,13-dimethoxy-3,13-dimethyl-2,14-dioxa-7,9-dithia-3,13-disila-8-stannapentadecane, 8,8-dibutyl-3,3,13,13-tetramethoxy-2,14-dioxa-7,9-dithia-3,13-disila-8-stannapentadecane and 8-butyl-3,3,13,13-tetramethoxy-8-((3-(trimethoxysilyl)propyl)thio)-2,14-dioxa-7,9-dithia-3,13-disila-8-stannapentadecane.

In the present invention, the term "monovalent hydrocarbon group" may mean a monovalent atomic group in which carbon and hydrogen are bonded, such as a monovalent alkyl group, alkenyl group, alkynyl group, cycloalkyl group, cycloalkyl group including one or more unsaturated bonds, and aryl group. The minimum carbon number of a substituent represented by the monovalent hydrocarbon may be determined according to the kind of each substituent.

In the present invention, the term "divalent hydrocarbon group" may mean a divalent atomic group in which carbon and hydrogen are bonded, such as a divalent alkylene group, alkenylene group, alkynylene group, cycloalkylene group, cycloalkylene group including one or more unsaturated bonds and arylene group. The minimum carbon number of a substituent represented by the divalent hydrocarbon may be determined according to the kind of each substituent.

In the present invention, the term "alkyl group" may mean a monovalent aliphatic saturated hydrocarbon and may include both linear alkyl such as methyl, ethyl, propyl and butyl, and branched alkyl such as isopropyl, sec-butyl, tert-butyl and neo-pentyl.

In the present invention, the term "alkylene group" may mean a divalent aliphatic saturated hydrocarbon such as methylene, ethylene, propylene and butylene.

In the present invention, the term "alkenyl group" may mean an alkyl group including one or two or more double bonds.

In the present invention, the term "alkynyl group" may mean an alkyl group including one or two or more triple bonds.

In the present invention, the term "cycloalkyl group" may include cyclic saturated hydrocarbon, or all cyclic unsaturated hydrocarbon including one or two or more unsaturated bonds.

In the present invention, the term "aryl group" may mean cyclic aromatic hydrocarbon, and may include both monocyclic aromatic hydrocarbon in which one ring is formed, and polycyclic aromatic hydrocarbon in which two or more rings are combined.

In the present invention, the term "heterocyclic group" may include both a cycloalkyl group and an aryl group, in which carbon atoms in the cycloalkyl group or the aryl group are substituted with one or more heteroatoms.

In order to prepare the modified conjugated diene-based polymer, the present invention provides a method of preparing a modified conjugated diene-based polymer. The method of preparing a modified conjugated diene-based polymer may include a step of polymerizing a conjugated diene-based monomer, or an aromatic vinyl-based monomer and a conjugated diene-based monomer, in the presence of an organometallic compound in a hydrocarbon solvent to prepare an active polymer which is coupled with an organometal (S1); and a step of reacting or coupling the active polymer prepared in step (S1) with a modifier (S2), wherein the step (S1) is continuously performed in two or more polymerization reactors, and a polymerization conversion ratio in a first reactor among the polymerization reactors may be 50% or less.

The hydrocarbon solvent is not specifically limited, but may be, for example, one or more selected from the group consisting of n-pentane, n-hexane, n-heptane, isooctane, cyclohexane, toluene, benzene and xylene.

According to an embodiment of the present invention, the organometallic compound may be used in 0.01 mmol to 10 mmol, 0.05 mmol to 5 mmol, 0.1 mmol to 2 mmol, 0.1 mmol to 1 mmol, or 0.15 to 0.8 mmol based on total 100 g of the monomer. The organometallic compound may be, for example, one or more selected from the group consisting of methyllithium, ethyllithium, propyllithium, isopropyllithium, n-butyllithium, s-butyllithium, t-butyllithium, hexyllithium, n-decyllithium, t-octyllithium, phenyllithium, 1-naphthyl lithium, n-eicosyl lithium, 4-butylphenyl lithium, 4-tolyl lithium, cyclohexyl lithium, 3,5-di-n-heptyl-cyclohexyl lithium, 4-cyclopentyl lithium, naphthyl sodium, naphthyl potassium, lithium alkoxide, sodium alkoxide, potassium alkoxide, lithium sulfonate, sodium sulfonate, potassium sulfonate, lithium amide, sodium amide, potassium amide, and lithium isopropylamide.

The polymerization of step (S1) may be, for example, an anionic polymerization, and particularly, a living anionic polymerization by which an anionic active part is formed at the polymerization terminal through a propagation reaction by anions. In addition, the polymerization of step (S1) may be a polymerization with heating, an isothermal polymerization, or a polymerization at a constant temperature (adiabatic polymerization). Here, the polymerization at a constant temperature means a polymerization method including a step of polymerizing using self-generated heat of reaction without optionally applying heat after adding an organometallic compound, and the polymerization with heating means a polymerization method including injecting the organometallic compound and then, increasing the temperature by optionally applying heat. The isothermal polymerization means a polymerization method by which the temperature of a polymer is kept constant by increasing heat by applying heat or taking heat after adding the organometallic compound.

In addition, according to an embodiment of the present invention, the polymerization of step (S1) may be performed by further adding a diene-based compound of 1 to 10 carbon atoms in addition to the conjugated diene-based monomer, and in this case, effect of preventing the formation of gel on the wall of a reactor during operation for a long time may be achieved. The diene-based compound may include, for example, 1,2-butadiene.

The polymerization of step (S1) may be conducted in a temperature range of 80° C. or less, −20° C. to 80° C., 0° C. to 80° C., 0° C. to 70° C., or 10° C. to 70° C. Within the range, the molecular weight distribution of a polymer is controlled narrow, and the improving effect of physical properties is excellent.

The active polymer prepared by step (S1) may mean a polymer in which a polymer anion and an organometallic cation are coupled.

According to an embodiment of the present invention, the active polymer prepared by the polymerization of step (S1) may be a random copolymer, and in this case, effect of excellent balance between each of physical properties may be achieved. The random copolymer may mean the arrangement of repeating units forming a copolymer in disorder.

According to an embodiment of the present invention, the method for preparing a modified conjugated diene-based polymer may be performed in a plurality of reactors including two or more polymerization reactors and a modification reactor by a continuous type polymerization method. In a particular embodiment, step (S1) may be performed continuously in two or more polymerization reactors including a first reactor, and the number of the polymerization reactor may be flexibly determined according to reaction conditions and environment. The continuous type polymerization method may mean reaction processes of continuously supplying reactants to a reactor and continuously discharging reaction products thus produced. By the continuous type polymerization method, productivity and processability may be excellent, and effect of excellent uniformity of the polymer thus prepared may be achieved.

In addition, according to an embodiment of the present invention, if the active polymer is continuously prepared in the polymerization reactor, a polymerization conversion ratio in the first reactor may be 50% or less, from 10% to 50%, or from 20% to 50%, and within this range, side reactions generated while forming a polymer after initiating polymerization reaction may be restrained and a polymer with a linear structure may be induced during polymerization. Thus, the molecular weight distribution of the polymer may be controlled narrow, and effect of excellent improvement of physical properties may be achieved.

In this case, the polymerization conversion ratio may be controlled according to the reaction temperature, the residence time in the reactor, etc.

The polymerization conversion ratio may be determined, for example, by measuring a solid concentration in a polymer solution phase including the polymer during polymerizing a polymer. In a particular embodiment, in order to secure the polymer solution, a cylinder type container is installed at the outlet of each polymerization reactor to fill a certain amount of the polymer solution in the cylinder type container. Then, the cylinder type container is separated from the reactor, the weight (A) of the cylinder filled with the polymer solution is measured, the polymer solution filled in the cylinder type container is transported to an aluminum container, for example, an aluminum dish, the weight (B) of the cylinder type container from which the polymer solution is removed is measured, the aluminum container containing the polymer solution is dried in an oven of 140° C. for 30 minutes, the weight (C) of a dried polymer is measured, and calculation is performed according to the following Mathematical Equation 1:

$$\text{Polymer conversion ratio (\%)} = \frac{\text{Weight }(C)}{[(\text{Weight }(A) - \text{Weight }(B))/\text{total solid content of each reactor (wt \%, TSC)}]}$$ [Mathematical Equation 1]

Meanwhile, the polymer polymerized in the first reactor may be transported to polymerization reactors before a modification reactor in order, and polymerization may be performed until the final polymerization conversion ratio becomes 95% or more. After performing the polymerization in the first reactor, the polymerization conversion ratio of the second reactor, or each reactor from the second reactor to the polymerization reactor before the modification reactor may be appropriately controlled to control molecular weight distribution.

Meanwhile, in step (S1), during preparing an active polymer, the residence time of a polymer in the first reactor may be from 1 minute to 40 minutes, from 1 minute to 30 minutes, or from 5 minutes to 30 minutes, and within this range, the control of a polymerization conversion ratio is easy, and thus, the molecular weight distribution of a polymer is possibly controlled narrow, and effect of improving physical properties may be excellent.

The term "polymer" used in the present invention may mean an intermediate of a polymer type, which is under polymerization in each reactor during performing step (S1) or may mean a polymer with a polymerization conversion ratio of less than 95% under polymerization in a reactor, after finishing step (S1) or step (S2) and prior to obtaining an active polymer or a modified conjugated diene-based polymer.

According to an embodiment of the present invention, the molecular weight distribution (PDI, polydispersed index; MWD, Mw/Mn) may be less than 1.5, from 1.0 to less than 1.5, or from 1.1 to less than 1.5, and within this range, the molecular weight distribution of a modified conjugated diene-based polymer which is prepared via a modification reaction or coupling with a modifier is narrow, and improving effect of physical properties may be excellent.

Meanwhile, the polymerization of step (S1) may be performed by including a polar additive, and the polar additive may be added in a ratio of 0.001 g to 50 g, 0.001 g to 10 g, or 0.005 g to 0.1 g based on total 100 g of the monomer. In another embodiment, the polar additive may be added in a ratio of 0.001 g to 10 g, 0.005 g to 5 g, or 0.005 g to 4 g based on total 1 mmol of the organometallic compound.

The polar additive may be, for example, one or more selected from the group consisting of tetrahydrofuran, 2,2-di(2-tetrahydrofuryl)propan, diethyl ether, cycloamyl ether, dipropyl ether, ethylene methyl ether, ethylene dimethyl ether, diethyl glycol, dimethyl ether, tert-butoxy ethoxy ethane, bis(3-dimethylaminoethyl)ether, (dimethylaminoethyl) ethyl ether, trimethylamine, triethylamine, tripropylamine, N,N,N',N'-tetramethylethylenediamine, sodium metholate, and 2-ethyl tetrahydrofufuryl ether, and may preferably be triethylamine, tetramethyleneethylenediamine, sodium metholate, or 2-ethyl tetrahydrofufuryl ether. If the polar additive is included, and if a conjugated diene-based monomer, or a conjugated diene-based monomer and an aromatic vinyl-based monomer are copolymerized, the difference of their reaction rates may be compensated, and effect of inducing easy formation of a random copolymer may be achieved.

According to an embodiment of the present invention, the reaction or coupling of step (S2) may be performed in a modification reactor, and in this case, the modifier may be used in an amount of 0.01 mmol to 10 mmol based on total 100 g of the monomer. In another embodiment, the modifier may be used in a molar ratio of 1:0.1 to 10, 1:0.1 to 5, or 1:0.1 to 1:3, based on 1 mol of the organometallic compound of step (S1).

In addition, according to an embodiment of the present invention, the modifier may be injected into a modification reactor, and step (S2) may be conducted in the modification reactor. In another embodiment, the modifier may be injected into a transporting part for transporting the active polymer prepared in step (S1) to a modification reactor for conducting step (S2), and the reaction or coupling may be performed by the mixing of the active polymer and the modifier in the transporting part.

According to the present invention, a rubber composition including the modified conjugated diene-based polymer is provided.

The rubber composition may include the modified conjugated diene-based polymer in an amount of 10 wt % or more, 10 wt % to 100 wt %, or 20 wt % to 90 wt % based on a total weight of the rubber composition, and within this range, mechanical properties such as tensile strength and abrasion resistance are excellent, and effect of excellent balance between each of physical properties may be achieved.

In addition, the rubber composition may further include other rubber component, if needed, in addition to the modified conjugated diene-based polymer, and in this case, the rubber component may be included in an amount of 90 wt % or less based on the total weight of the rubber composition. In a particular embodiment, the rubber component may be included in an amount of 1 part by weight to 900 parts by weight based on 100 parts by weight of the modified conjugated diene-based copolymer.

The rubber component may be, for example, a natural rubber or a synthetic rubber, and may particularly be a natural rubber (NR) including cis-1,4-polyisoprene; a modified natural rubber which is obtained by modifying or purifying a common natural rubber, such as an epoxidized natural rubber (ENR), a deproteinized natural rubber (DPNR), and a hydrogenated natural rubber; and a synthetic rubber such as a styrene-butadiene copolymer (SBR), a polybutadiene (BR), a polyisoprene (IR), a butyl rubber (IIR), an ethylene-propylene copolymer, a polyisobutylene-co-isoprene, a neoprene, a polyethylene-co-propylene), a poly(styrene-co-butadiene), a poly(styrene-co-isoprene), a poly(styrene-co-isoprene-co-butadiene), a poly(isoprene-co-butadiene), a poly(ethylene-co-propylene-co-diene), a polysulfide rubber, an acryl rubber, a urethane rubber, a silicone rubber, an epichlorohydrin rubber, a butyl rubber, and a halogenated butyl rubber, and any one or a mixture two or more thereof may be used.

The rubber composition may include a filler of 0.1 parts by weight to 200 parts by weight, or 10 parts by weight to 120 parts by weight based on 100 parts by weight of the modified conjugated diene-based polymer of the present invention. The filler may be, for example, a silica-based filler, particularly, wet silica (hydrated silicate), dry silica (anhydrous silicate), calcium silicate, aluminum silicate, or colloid silica. Preferably, the filler may be wet silica which has the most significant improving effect of destruction characteristics and compatible effect of wet grip. In addition, the rubber composition may further include a carbon-based filler, if needed.

In another embodiment, if silica is used as the filler, a silane coupling agent may be used together for the improvement of reinforcing and low exothermic properties. Particular examples of the silane coupling agent may include bis(3-triethoxysilylpropyl)tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl)tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N,N-dimethylthiocarbamoyltetrasulfide, 3-trimethoxysilylpropylbenzothiazolyltetrasulfide, 3-triethoxysilylpropylbenzolyltetrasulfide, 3-triethoxysilylpropylmethacrylatemonosulfide, 3-trimethoxysilylpropylmethacrylatemonosulfide, bis(3-diethoxymethylsilylpropyl)tetrasulfide, 3-mercaptopropyldimethoxymethylsilane, dimethoxymethylsilylpropyl-N,N-dimethylthiocarbamoyltetrasulfide, or dimethoxymethylsilylpropylbenzothiazolyltetrasulfide, and any one or a mixture of two or more thereof may be used. Preferably, bis(3-triethoxysilylpropyl) polysulfide or 3-trimethoxysilylpropylbenzothiazyltetrasulfide may be used in consideration of the improving effect of reinforcing properties.

In addition, in the rubber composition according to an embodiment of the present invention, since a modified conjugated diene-based polymer in which a functional group having high affinity with silica is brought in an active part is used as a rubber component, the mixing amount of the silane coupling agent may be smaller than a common case. Thus, the silane coupling agent may be used in an amount of 1 part by weight to 20 parts by weight, or 5 parts by weight to 15 parts by weight based on 100 parts by weight of silica. Within the above amount range, effect as a coupling agent may be sufficiently exhibited, and preventing effect of gelation of a rubber component may be achieved.

The rubber composition according to an embodiment of the present invention may be sulfur crosslinkable, and so may further include a vulcanizing agent. The vulcanizing agent may particularly be a sulfur powder and may be included in an amount of 0.1 parts by weight to 10 parts by weight based on 100 parts by weight of a rubber component. Within the above amount range, elasticity and strength required for a vulcanized rubber composition may be secured, and at the same time, an excellent low fuel consumption ratio may be achieved.

The rubber composition according to an embodiment of the present invention may further include various additives used in a common rubber industry in addition to the above components, particularly, a vulcanization accelerator, a process oil, an antioxidant, a plasticizer, an antiaging agent, a scorch preventing agent, a zinc white, stearic acid, a thermosetting resin, or a thermoplastic resin.

The vulcanization accelerator may include, for example, thiazole-based compounds such as 2-mercaptobenzothiazole (M), dibenzothiazyldisulfide (DM), and N-cyclohexyl-2-benzothiazylsulfenamide (CZ), or guanidine-based compounds such as diphenylguanidine (DPG), in an amount of 0.1 parts by weight to 5 parts by weight based on 100 parts by weight of the rubber component.

The process oil acts as a softener in a rubber composition and may include, for example, a paraffin-based, naphthene-based, or aromatic compound. An aromatic process oil may be used in consideration of tensile strength and abrasion resistance, and a naphthene-based or paraffin-based process oil may be used in consideration of hysteresis loss and properties at a low temperature. The process oil may be included in an amount of 100 parts by weight or less based on 100 parts by weight of the rubber component. Within the above-described range, the deterioration of the tensile strength and low exothermic properties (low fuel consumption ratio) of the vulcanized rubber may be prevented.

The antioxidant may include, for example, 2,6-di-t-butyl paracresol, dibutylhydroxytoluenyl, 2,6-bis((dodecylthio)methyl)-4-nonylphenol or 2-methyl-4,6-bis((octylthio)methyl)phenol, and may be used in an amount of 0.1 parts by weight to 6 parts by weight based on 100 parts by weight of a rubber component.

The antiaging agent may include, for example, N-isopropyl-N'-phenyl-p-phenylenediamine, N-(1,3-dimethylbutyl)-N'-phenyl-p-phenylenediamine, 6-ethoxy-2,2,4-trimethyl-1,2-dihydroquinoline, or a condensate of diphenylamine and acetone at a high temperature, in an amount of 0.1 parts by weight to 6 parts by weight based on 100 parts by weight of the rubber component.

The rubber composition according to an embodiment of the present invention may be obtained by mulling using a mulling apparatus such as a banbury mixer, a roll, and an internal mixer according to a mixing prescription. A rubber composition having low exothermic properties and good abrasion properties may be obtained by a vulcanization process after a molding process.

Therefore, the rubber composition may be useful to the manufacture of each member of a tire such as a tire tread, an under tread, a side wall, a carcass coating rubber, a belt coating rubber, a bead filler, a chafer, and a bead coating rubber, or to the manufacture of rubber products in various industries such as a vibration-proof rubber, a belt conveyor, and a hose.

Also, the present invention provides a tire manufactured using the rubber composition.

The tire may be a tire or include a tire tread.

EXAMPLES

Hereinafter, the present invention will be explained in more detail referring to embodiments. Embodiments according to the present invention may be modified into various other types, and the scope of the present invention should not be limited to the embodiments described below. The embodiments of the present invention are provided for completely explaining the present invention to a person having an average knowledge in the art.

Example 1

To a first reactor among continuous reactors of three reactors connected in series, injected were a styrene solution in which 60 wt % of styrene was dissolved in n-hexane in a rate of 1.80 kg/h, a 1,3-butadiene solution in which 60 wt % of 1,3-butadiene was dissolved in n-hexane in a rate of 14.2 kg/h, n-hexane in a rate of 49.11 kg/h, a 1,2-butadiene solution in which 2.0 wt % of 1,2-butadiene was dissolved in n-hexane in a rate of 40 g/h, a solution in which 10 wt % of 2,2-(di(2-tetrahydrofuryl)propan was dissolved in n-hexane as a polar additive in a rate of 78.0 g/h, and an n-butyllithium solution in which 10 wt % of n-butyllithium was dissolved in n-hexane as a polymerization initiator in a rate of 59.0 g/h. In this case, the temperature of the first reactor was maintained to 50° C., and when a polymerization conversion ratio reached 30%, a polymer was transported from the first reactor to a second reactor via a transport pipe.

Then, to the second reactor, a 1,3-butadiene solution in which 60 wt % of 1,3-butadiene was dissolved in n-hexane was injected in a rate of 0.74 kg/h. In this case, the temperature of the second reactor was maintained to 65° C., and when a polymerization conversion ratio reached 95%, a polymer was transported from the second reactor to a third reactor via a transport pipe.

The polymer was transported from the second reactor to the third reactor, and a solution in which 20 wt % of N,N-diethyl-3-(trimethoxysilyl)propan-1-amine as a modifier was dissolved, was injected to a third reactor in the rate of 55 g/h. The temperature of the third reactor was maintained to 65° C.

After that, to a polymerization solution discharged from the third reactor, an IR1520 (BASF Co.) solution in which 30 wt % of an antioxidant was dissolved, was injected in a rate of 167 g/h and stirred. The polymer thus obtained was injected in hot water heated with steam and stirred to remove solvents to prepare a modified conjugated diene-based polymer.

Example 2

A modified conjugated diene-based polymer was prepared by performing the same method as Example 1 except for continuously supplying a solution in which 20 wt % of 3,3'-(1,1,3,3-tetramethoxydisiloxane-1,3-diyl)bis(N,N-diethylpropan-1-amine) was dissolved as a modifier instead of N,N-diethyl-3-(trimethoxysilyl)propan-1-amine, to a third reactor in a rate of 100 g/h.

Example 3

A modified conjugated diene-based polymer was prepared by performing the same method as Example 1 except for continuously supplying a solution in which 20 wt % of 8,8-dibutyl-3,13-dimethoxy-3,13-dimethyl-2,14-dioxa-7,9-dithia-3,13-disila-8-stannapentadecane was dissolved as a modifier instead of N,N-diethyl-3-(trimethoxysilyl)propan-1-amine, to a third reactor in a rate of 140 g/h.

Example 4

To a first reactor among continuous reactors of three reactors connected in series, injected were a styrene solution in which 60 wt % of styrene was dissolved in n-hexane in a rate of 1.80 kg/h, a 1,3-butadiene solution in which 60 wt % of 1,3-butadiene was dissolved in n-hexane in a rate of 14.2 kg/h, n-hexane in a rate of 49.11 kg/h, a 1,2-butadiene solution in which 2.0 wt % of 1,2-butadiene was dissolved in n-hexane in a rate of 40 g/h, a solution in which 10 wt % of 2,2-di(2-tetrahydrofuryl)propan was dissolved in n-hexane as a polar additive in a rate of 51.0 g/h, and an n-butyllithium solution in which 10 wt % of n-butyllithium was dissolved in n-hexane as a polymerization initiator in a rate of 59.0 g/h. In this case, the temperature of the first reactor was maintained to 55° C., and when a polymerization conversion ratio reached 30%, a polymer was transported from the first reactor to a second reactor via a transport pipe.

Then, to the second reactor, a 1,3-butadiene solution in which 60 wt % of 1,3-butadiene was dissolved in n-hexane was injected in a rate of 0.74 kg/h. In this case, the temperature of the second reactor was maintained to 65° C., and when a polymerization conversion ratio reached 95%, a polymer was transported from the second reactor to a third reactor via a transport pipe.

The polymer was transported from the second reactor to the third reactor, and a solution in which 20 wt % of N,N-diethyl-3-(trimethoxysilyl)propan-1-amine as was dissolved a modifier, was injected to the third reactor in a rate of 55 g/h. The temperature of the third reactor was maintained to 65° C.

After that, to a polymerization solution discharged from the third reactor, an IR1520 (BASF Co.) solution in which 30 wt % of an antioxidant was dissolved, was injected in a rate of 167 g/h and stirred. The polymer thus obtained was injected in hot water heated with steam and stirred to remove solvents to prepare a modified conjugated diene-based polymer.

Example 5

A modified conjugated diene-based polymer was prepared by performing the same method as Example 4 except for continuously supplying a solution in which 20 wt % of 3,3'-(1,1,3,3-tetramethoxydisiloxane-1,3-diyl)bis(N,N-diethylpropan-1-amine) was dissolved as a modifier instead of N,N-diethyl-3-(trimethoxysilyl)propan-1-amine, to a third reactor in a rate of 100 g/h.

Example 6

A modified conjugated diene-based polymer was prepared by performing the same method as Example 4 except for continuously supplying a solution in which 20 wt % of 8,8-dibutyl-3,13-dimethoxy-3,13-dimethyl-2,14-dioxa-7,9-dithia-3,13-disila-8-stannapentadecane was dissolved as a modifier instead of N,N-diethyl-3-(trimethoxysilyl)propan-1-amine, to a third reactor in a rate of 140 g/h.

Example 7

To a first reactor among continuous reactors of three reactors connected in series, injected were a styrene solution in which 60 wt % of styrene was dissolved in n-hexane in a rate of 1.80 kg/h, a 1,3-butadiene solution in which 60 wt % of 1,3-butadiene was dissolved in n-hexane in a rate of 14.2 kg/h, n-hexane in a rate of 49.11 kg/h, a 1,2-butadiene solution in which 2.0 wt % of 1,2-butadiene was dissolved in n-hexane in a rate of 40 g/h, a solution in which 10 wt % of 2,2-di(2-tetrahydrofuryl)propan was dissolved in n-hexane as a polar additive in a rate of 27.0 g/h, and an n-butyllithium solution in which 10 wt % of n-butyllithium was dissolved in n-hexane as a polymerization initiator in a rate of 59.0 g/h. In this case, the temperature of the first reactor was maintained to 60° C., and when a polymerization conversion ratio reached 30%, a polymer was transported from the first reactor to a second reactor via a transport pipe.

Then, to the second reactor, a 1,3-butadiene solution in which 60 wt % of 1,3-butadiene was dissolved in n-hexane was injected in a rate of 0.74 kg/h. In this case, the temperature of the second reactor was maintained to 65° C., and when a polymerization conversion ratio reached 95%, a polymer was transported from the second reactor to a third reactor via a transport pipe.

The polymer was transported from the second reactor to the third reactor, and a solution in which 20 wt % of N,N-diethyl-3-(trimethoxysilyl)propan-1-amine was dissolved as a modifier, was injected to the third reactor in a rate of 55 g/h. The temperature of the third reactor was maintained to 65° C.

After that, to a polymerization solution discharged from the third reactor, an IR1520 (BASF Co.) solution in which 30 wt % of an antioxidant was dissolved, was injected in a rate of 167 g/h and stirred. The polymer thus obtained was injected in hot water heated with steam and stirred to remove solvents to prepare a modified conjugated diene-based polymer.

Example 8

A modified conjugated diene-based polymer was prepared by performing the same method as Example 7 except for continuously supplying a solution in which 20 wt % of 3,3'-(1,1,3,3-tetramethoxydisiloxane-1,3-diyl)bis(N,N-diethylpropan-1-amine) was dissolved as a modifier instead of N,N-diethyl-3-(trimethoxysilyl)propan-1-amine, to a third reactor in a rate of 100 g/h.

Example 9

A modified conjugated diene-based polymer was prepared by performing the same method as Example 7 except for continuously supplying a solution in which 20 wt % of 8,8-dibutyl-3,13-dimethoxy-3,13-dimethyl-2,14-dioxa-7,9-dithia-3,13-disila-8-stannapentadecane was dissolved as a modifier instead of N,N-diethyl-3-(trimethoxysilyl)propan-1-amine, to a third reactor in a rate of 140 g/h.

Example 10

A modified conjugated diene-based polymer was prepared by performing the same method as Example 7 except for continuously supplying a solution in which 10 wt % of N,N,N',N'-tetramethylethylenediamine was dissolved in n-hexane as a polar additive instead of 2,2-di(2-(etrahydrofuryl)propan, in a rate of 20.0 g/h, and maintaining the reaction temperature to 65° C. in a first reactor, 70° C. in a second reactor, and 70° C. in a third reactor.

Example 11

To a first reactor among continuous reactors of two reactors connected in series, injected were a styrene solution in which 60 wt % of styrene was dissolved in n-hexane in a rate of 1.80 kg/h, a 1,3-butadiene solution in which 60 wt % of 1,3-butadiene was dissolved in n-hexane in a rate of 14.2 kg/h, n-hexane in a rate of 49.11 kg/h, a 1,2-butadiene solution in which 2.0 wt % of 1,2-butadiene was dissolved in n-hexane in a rate of 40 g/h, a solution in which 10 wt % of 2,2-di(2-tetrahydrofuryl)propan was dissolved in n-hexane as a polar additive in a rate of 78.0 g/h, and an n-butyllithium solution in which 10 wt % of n-butyllithium was dissolved in n-hexane as a polymerization initiator in a rate of 59.0 g/h. In this case, the temperature of the first reactor was maintained to 50° C., and when a polymerization conversion ratio reached 30%, a polymer was transported from the first reactor to a second reactor via a transport pipe.

Then, to the second reactor, a 1,3-butadiene solution in which 60 wt % of 1,3-butadiene was dissolved in n-hexane was injected in a rate of 0.75 kg/h. In this case, the temperature of the second reactor was maintained to 60° C., and when a polymerization conversion ratio reached 95%, a polymer was transported from the second reactor to a blend tank via a transport pipe.

During transporting the polymer from the second reactor to the blend tank, a solution in which 20 wt % of 3-(1H-imidazol-1-yl)-N,N-bis(3-(triethoxysilyl)propyl)propan-1-amine was dissolved as a modifier, was injected to a transport line for the transportation to the blend tank, in a rate of 125 g/h. After that, to a polymerization solution discharged from the second reactor, an IR1520 (BASF Co.) solution in which 30 wt % of an antioxidant was dissolved, was injected in a rate of 167 g/h and stirred. The polymer thus obtained was injected in hot water heated with steam and stirred to remove solvents to prepare a modified conjugated diene-based polymer.

Example 12

A modified conjugated diene-based polymer was prepared by performing the same method as Example 11 except for polymerizing by continuously injecting a solution in which 10 wt % of 2,2-di(2-(tetrahydrofuryl)propan was dissolved as a polar additive in n-hexane in a rate of 27.0 g/h, and maintaining the reaction temperature to 60° C. in a first reactor.

Example 13

A modified conjugated diene-based polymer was prepared by performing the same method as Example 14 except for polymerizing by continuously injecting a solution in which 10 wt % of 2,2-di(2-(tetrahydrofuryl)propan was dissolved in n-hexane as a polar additive in a rate of 27.0 g/h, and maintaining the reaction temperature to 60° C. in a first reactor.

Comparative Example 1

A modified conjugated diene-based polymer was prepared by performing the same method as Example 1 except for maintaining the reaction temperature to 70° C. in a first reactor, 80° C. in a second reactor, and 80° C. in a third reactor, transporting a polymer from the first reactor to the second reactor via a transport pipe when a polymerization conversion ratio in the first reactor reached 70%, and polymerizing by continuously injecting a solution in which 2 wt % of tetrachlorosilane was dissolved as a modifier in n-hexane, to the third reactor in a rate of 40 g/h.

Comparative Example 2

A modified conjugated diene-based polymer was prepared by performing the same method as Example 1 except for polymerizing by maintaining the reaction temperature to 70° C. in a first reactor, 80° C. in a second reactor, and 80° C. in a third reactor, and transporting a polymer from the first reactor to the second reactor via a transport pipe when a polymerization conversion ratio in the first reactor reached 70%.

Comparative Example 3

A modified conjugated diene-based polymer was prepared by performing the same method as Example 4 except for maintaining the reaction temperature to 75° C. in a first reactor, 80° C. in a second reactor, and 80° C. in a third reactor, transporting a polymer from the first reactor to the second reactor via a transport pipe when a polymerization conversion ratio in the first reactor reached 70%, and polymerizing by continuously injecting a solution in which 2 wt % of tetrachlorosilane was dissolved as a modifier in n-hexane, to the third reactor in a rate of 40 g/h.

Comparative Example 4

A modified conjugated diene-based polymer was prepared by performing the same method as Example 4 except for polymerizing by maintaining the reaction temperature to 75° C. in a first reactor, 80° C. in a second reactor, and 80° C. in a third reactor, and transporting a polymer from the first reactor to the second reactor via a transport pipe when a polymerization conversion ratio in the first reactor reached 70%.

Comparative Example 5

To a 20 L autoclave reactor, 100 g of styrene, 880 g of 1,3-butadiene, 5,000 g of n-hexane and 0.89 g of 2,2-di(2-tetrahydrofuryl)propan as a polar additive were injected, and the internal temperature of the reactor was elevated to 50° C. When the internal temperature of the reactor reached 50° C., 4.7 mmol of n-butyllithium as a polymerization initiator was injected and an adiabatic reaction with heating was performed. After about 20 minutes lapse, 20 g of 1,3-butadiene was injected for capping the terminals of a polymer with butadiene. After 5 minutes, 4.7 mmol of N,N-diethyl-3-(trimethoxysilyl)propan-1-amine was injected and reacted for 15 minutes. Then, the polymerization reaction was quenched using ethanol, and 45 ml of a solution in which 0.3 wt % of IR1520 (BASF Co.) antioxidant was dissolved in n-hexane was added thereto. The polymer thus obtained was injected into hot water heated using steam and stirred to remove solvents to prepare a conjugated diene-based polymer.

Comparative Example 6

A modified conjugated diene-based polymer was prepared by performing the same method as Example 7 except for maintaining the reaction temperature to 80° C. in a first reactor, 85° C. in a second reactor, and 85° C. in a third reactor, transporting a polymer from the first reactor to the second reactor via a transport pipe when a polymerization conversion ratio in the first reactor reached 70%, and polymerizing by continuously injecting a solution in which 2 wt % of tetrachlorosilane was dissolved as a modifier in n-hexane, to the third reactor in a rate of 40 g/h.

Comparative Example 7

A modified conjugated diene-based polymer was prepared by performing the same method as Example 7 except for polymerizing by maintaining the reaction temperature to 80° C. in a first reactor, 85° C. in a second reactor, and 85° C. in a third reactor, and transporting a polymer from the first reactor to the second reactor via a transport pipe when a polymerization conversion ratio in the first reactor reached 70%.

EXPERIMENTAL EXAMPLES

Experimental Example 1

With respect to each of the modified or unmodified conjugated diene-based polymers prepared in the examples and the comparative examples, styrene unit and vinyl contents in each polymer, a weight average molecular weight (Mw, x$10^3$ g/mol), a number average molecular weight (Mn, x$10^3$ g/mol), molecular weight distribution (PDI, MWD), Mooney viscosity (MV), and a Si content were measured. The results are shown in Table 1 to Table 5 below. In addition, reaction conditions and polar additives and modifiers used in Examples 1 to 13 and Comparative Examples 1 to 7 are summarized and shown in Table 1 and Table 2 below.

1) Styrene Unit and Vinyl Contents (wt %)

The styrene unit (SM) and vinyl contents in each polymer were measured and analyzed using Varian VNMRS 500 MHz NMR.

When measuring NMR, 1,1,2,2-tetrachloroethanol was used as a solvent, and styrene unit and vinyl contents were calculated by calculating a solvent peak as 5.97 ppm, and regarding 7.2-6.9 ppm as random styrene peaks, 6.9-6.2 ppm as block styrene peaks, 5.8-5.1 ppm as 1,4-vinyl peaks, and 5.1-4.5 ppm as 1,2-vinyl peaks.

2) Weight Average Molecular Weight (Mw, x$10^3$ g/mol), Number Average Molecular Weight (Mn, x$10^3$ g/mol) and Molecular Weight Distribution (PDI, MWD)

Figure 1:
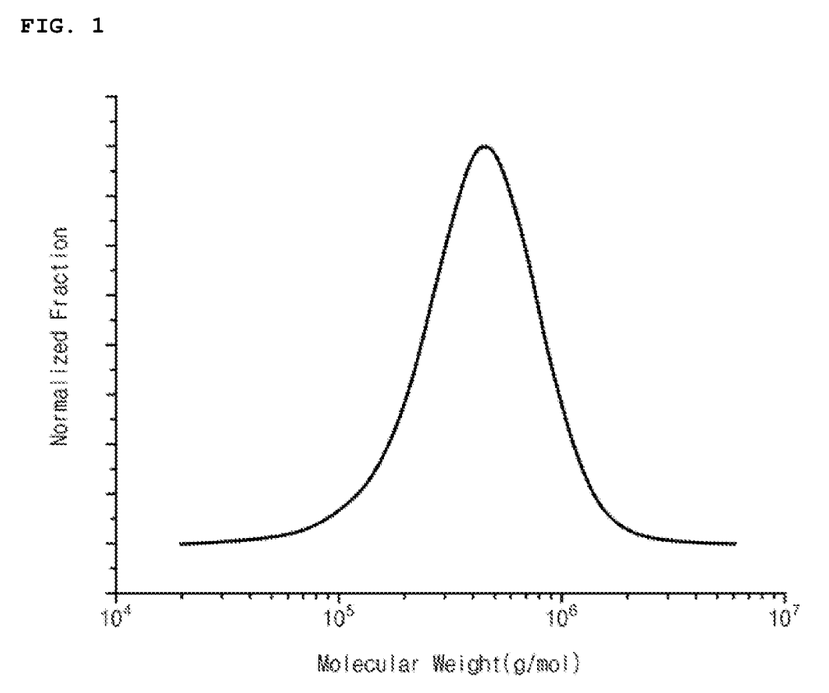
FIG. 1 illustrates a molecular weight distribution curve by gel permeation chromatography (GPC) of a modified conjugated diene-based polymer of Example 4 according to an embodiment of the present invention.
Figure 2:
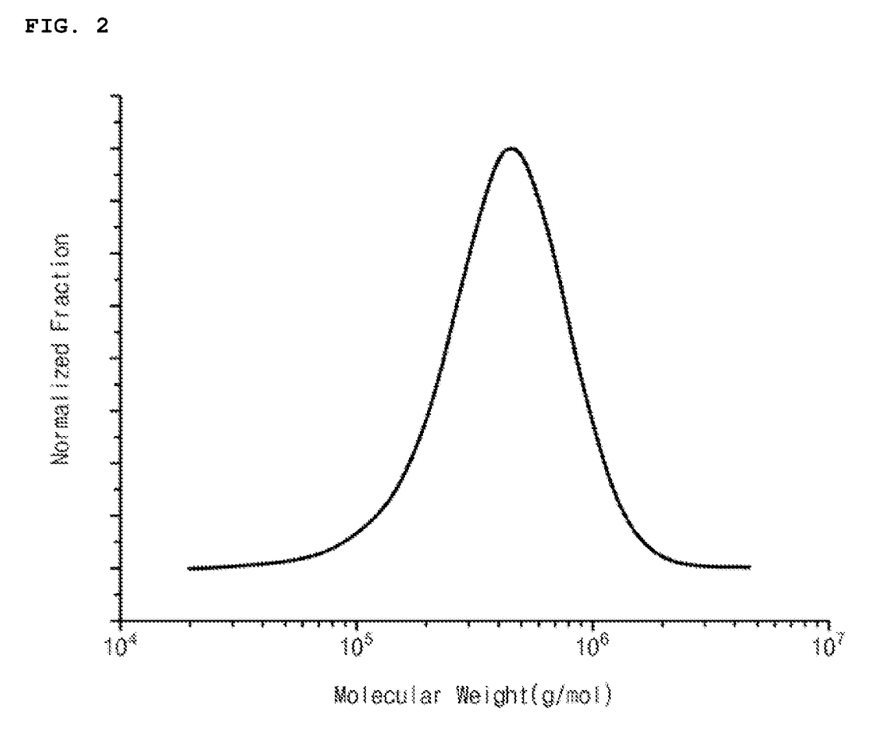
FIG. 2 illustrates a molecular weight distribution curve by gel permeation chromatography (GPC) of a modified conjugated diene-based polymer of Example 5 according to an embodiment of the present invention.
Figure 3:
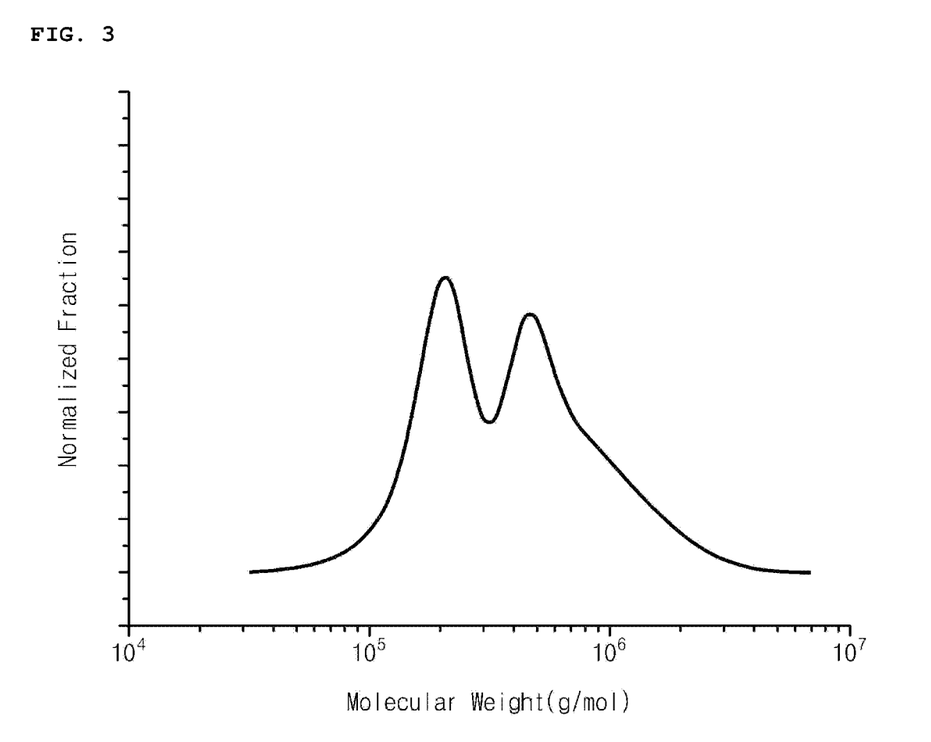
FIG. 3 illustrates a molecular weight distribution curve by gel permeation chromatography (GPC) of a modified conjugated diene-based polymer of Comparative Example 5 according to an embodiment of the present invention.

By gel permeation chromatography (GPC) analysis, the weight average molecular weight (Mw) and the number average molecular weight (Mn) were measured and a molecular weight distribution curve was obtained. In addition, the molecular weight distribution (PDI, MWD, Mw/Mn) was calculated from each molecular weight thus measured. Particularly, GPC was conducted using two columns of PLgel Olexis (Polymer Laboratories Co.) and one column of PLgel mixed-C (Polymer Laboratories Co.) in combination, and polystyrene (PS) as a GPC standard material for calculating the molecular weights. A solvent for measuring GPC was prepared by mixing tetrahydrofuran with 2 wt % of an amine compound. In this case, the molecular weight distribution curves thus obtained are shown in FIG. 1 to FIG. 3.

3) Mooney Viscosity

The Mooney viscosity (MV, (ML1+4, @100° C.) MU) was measured by using MV-2000 (Alpha Technologies Co.) using Large Rotor at a rotor speed of 2±0.02 rpm at 100° C. In this case, a specimen used was stood at room temperature (23±3° C.) for 30 minutes or more, and 27±3 g of the specimen was collected and put in a die cavity, and then, Platen was operated for measurement.

4) Si Content

The Si content was measured by an ICP analysis method, which used an inductively coupled plasma optical emission spectroscopy (ICP-OES; Optima 7300DV). If the inductively coupled plasma optical emission spectroscopy was used, measurement was performed by adding about 0.7 g of a specimen to a platinum (Pt) crucible and adding about 1 ml of concentrated sulfuric acid (98 wt %, electronic grade) thereto, heating at 300° C. for 3 hours, incinerating the specimen in an electrical furnace (Thermo Scientific, Lindberg Blue M) by the following program of steps 1 to 3:

1) step 1: initial temp 0° C., rate (temp/hr) 180° C./hr, temp (holdtime) 180° C. (1 hr)

2) step 2: initial temp 180° C., rate (temp/hr) 85° C./hr, temp (holdtime) 370° C. (2 hr)

3) step 3: initial temp 370° C., rate (temp/hr) 47° C./hr, temp (holdtime) 510° C. (3 hr), adding 1 ml of concentrated nitric acid (48 wt %) and 20 µl of concentrated hydrofluoric acid (50 wt %) to a residue, sealing the platinum crucible and shaking for 30 minutes or more, adding 1 ml of boric acid to the specimen, storing at 0° C. for 2 hours or more, diluting in 30 ml of ultrapure water, and performing incineration.

TABLE 1

| Division | | Example | | | | | | | | | | | | |
|---|---|---|---|---|---|---|---|---|---|---|---|---|---|---|
| | | 1 | 2 | 3 | 4 | 5 | 6 | 7 | 8 | 9 | 10 | 11 | 12 | 13 |
| Reaction conditions | Number of reactor | 3 | 3 | 3 | 3 | 3 | 3 | 3 | 3 | 3 | 3 | 2 | 2 | 2 |
| | Polar additive | DTP | DTP | DTP | DTP | DTP | DTP | DTP | DTP | DTP | TMEDA | DTP | DTP | DTP |
| | Modifier | A | B | C | A | B | C | A | B | C | A | D | D | D |
| | PI:PA | | 1:0.9 | | | 1:0.6 | | | 1:0.3 | | 1:0.4 | 1:0.9 | 1:0.6 | 1:0.3 |
| | M:PI | | | | | | | 1:1 | | | | | | |
| | First reactor temp (° C.) | 50 | 50 | 50 | 55 | 55 | 55 | 60 | 60 | 60 | 60 | 50 | 55 | 60 |
| | First reactor polymerization conversion ratio (%) | 30 | 30 | 30 | 30 | 30 | 30 | 30 | 30 | 30 | 30 | 30 | 30 | 30 |
| NMR (wt %) | SM | 10 | 10 | 10 | 10 | 10 | 10 | 10 | 10 | 10 | 10 | 10 | 10 | 10 |
| | Vinyl | 50 | 50 | 50 | 38 | 38 | 38 | 20 | 20 | 20 | 20 | 50 | 38 | 20 |
| GPC | Mw (×10³ g/mol) | 449 | 441 | 440 | 444 | 444 | 445 | 445 | 447 | 446 | 466 | 621 | 622 | 626 |
| | Mn (×10³ g/mol) | 301 | 304 | 304 | 299 | 300 | 300 | 301 | 302 | 300 | 300 | 399 | 398 | 401 |
| | PDI | 1.49 | 1.45 | 1.45 | 1.48 | 1.48 | 1.48 | 1.48 | 1.48 | 1.49 | 1.55 | 1.56 | 1.56 | 1.55 |
| Mooney viscosity (MV) | | 62 | 61 | 61 | 61 | 60 | 60 | 60 | 80 | 59 | 60 | 81 | 81 | 60 |
| Si content (ppm) | | 130 | 261 | 265 | 128 | 260 | 264 | 131 | 262 | 261 | 130 | 268 | 266 | 269 |

TABLE 2

| Division | | Comparative Example | | | | | | |
|---|---|---|---|---|---|---|---|---|
| | | 1 | 2 | 3 | 4 | 5 | 6 | 7 |
| Reaction conditions | Number of reactor | 3 | 3 | 3 | 3 | Batch | 2 | 2 |
| | Polar additive | DTP | DTP | DTP | DTP | DTP | DTP | DTP |
| | Modifier (or coupling agent) | E | A | E | A | A | E | A |
| | PI:PA (molar ratio) | 1:0.9 | | 1:0.6 | | 1:0.6 | 1:0.3 | |
| | M:PI (molar ratio) | 0:1:1 | 1:1 | 0.1:1 | 1:1 | 1:1 | 0.1:1 | 1:1 |
| | First reactor temp (° C.) | 70 | 70 | 75 | 75 | 50 -> 75 | 80 | 80 |
| | First reactor polymerization conversion ratio (%) | 70 | 70 | 70 | 70 | — | 70 | 70 |

TABLE 2-continued

|  | Division | Comparative Example | | | | | | |
|---|---|---|---|---|---|---|---|---|
|  |  | 1 | 2 | 3 | 4 | 5 | 6 | 7 |
| NMR (wt %) | SM | 10 | 10 | 10 | 10 | 10 | 10 | 10 |
|  | Vinyl | 50 | 50 | 38 | 38 | 38 | 20 | 20 |
| GPC | Mw (×10³ g/mol) | 620 | 603 | 615 | 600 | 532 | 617 | 599 |
|  | Mn (×10³ g/mol) | 304 | 300 | 303 | 300 | 291 | 301 | 301 |
|  | PDI | 2.04 | 2.01 | 2.03 | 2.00 | 1.83 | 2.05 | 1.99 |
| Mooney viscosity (MV) |  | 67 | 67 | 67 | 66 | 73 | 67 | 66 |
| Si content (ppm) |  | 10 | 128 | 11 | 131 | 128 | 10 | 130 |

In Table 1 and Table 2, particular materials and ratios used as the polar additives, the modifiers and the coupling agents are as follows.

PI:PA=molar ratio of polymerization initiator (act. Li) and polar additive

M:PI=molar ratio of modifier (or coupling agent) and polymerization initiator (act. Li)

DTP: 2,2-di(2-tetrahydrofuryl)propan

TMEDA: N,N,N',N'-tetramethylethylenediamine

Modifier A: N,N-diethyl-3-(trimethoxysilyl)propan-1-amine

Modifier B: 3,3'-(1,1,3,3-tetramethoxydisiloxane-1,3-diyl)bis(N,N-diethylpropan-1-amine)

Modifier C: 8,8-dibutyl-3,13-dimethoxy-3,13-dimethyl-2,14-dioxa-7,9-thia-3,13-disila-8-stannapentadecane Modifier D: 3-(1H-imidazol-1-yl)-N,N-bis(3-(triethoxysilyl)propyl)propan-1-amine Coupling agent E: tetrachlorosilane As shown in Table 1 and Table 2, the modified conjugated diene-based polymers of Examples 1 to 13 according to exemplary embodiments of the present invention were found to have a unimodal molecular weight distribution curve measured by gel permeation chromatography (see FIG. 1 and FIG. 2), PDI of less than 1.7 and a Si content of 100 ppm or more. On the other hand, all modified or unmodified conjugated diene-based polymers of Comparative Examples 1 to 7 had PDI of greater than 1.7. Particularly, the modified conjugated diene-based polymer of Comparative Example 5 showed a bimodal shape molecular weight distribution curve by gel permeation chromatography (see FIG. 3).

Experimental Example 2

In order to comparatively analyze the physical properties of rubber compositions including each of the modified or unmodified copolymers prepared in the examples and the comparative examples and molded articles manufactured therefrom, tensile properties and viscoelasticity properties were measured, and the results are shown in Table 4 to Table 6 below.

1) Preparation of Rubber Specimen

Blending was performed using each of the modified or unmodified conjugated diene-based polymers of the examples and the comparative examples as a raw material rubber under the blending conditions shown in Table 3. The raw materials in Table 3 are represented by parts by weight based on 100 parts by weight of the raw material rubber.

TABLE 3

| Division | Raw material | Amount (parts by weight) |
|---|---|---|
| First stage mulling | Rubber | 100 |
|  | Silica | 70 |

TABLE 3-continued

| Division | Raw material | Amount (parts by weight) |
|---|---|---|
|  | Coupling agent (X50S) | 11.2 |
|  | Process oil | 37.5 |
|  | Zinc white | 3 |
|  | Stearic acid | 2 |
|  | Antioxidant | 2 |
|  | Antiaging agent | 2 |
|  | wax | 1 |
| Second stage mulling | Sulfur | 1.5 |
|  | Rubber accelerator | 1.75 |
|  | Vulcanization accelerator | 2 |

Particularly, the rubber specimen was mulled via a first stage mulling and a second stage mulling. In the first stage mulling, a raw material rubber, silica (filler), an organic silane coupling agent, a process oil, zinc oxide, stearic acid, an antioxidant, an antiaging agent and wax were mulled using a banbury mixer equipped with a temperature controlling apparatus. In this case, the initial temperature of a mulling apparatus was controlled to 70° C., and after finishing mixing, a first compound mixture was obtained at a discharge temperature of 145° C. to 155° C. In the second stage mulling, the first compound mixture was cooled to room temperature, and the first compound mixture, sulfur, a rubber accelerator, and a vulcanization accelerator were added to the mulling apparatus and mixed at a temperature of 100° C. or less to obtain a second compound mixture. Then, via a curing process at 160° C. for 20 minutes, a rubber specimen was formed.

2) Tensile Properties

The tensile properties were measured by manufacturing each specimen and measuring tensile strength when broken and tensile stress when stretched by 300% (300% modulus) of each specimen according to an ASTM 412 tensile test method. Particularly, tensile properties were measured using a Universal Test Machin 4204 tensile tester (Instron Co.) in a rate of 50 cm/min at room temperature. In this case, each of the resultant values of Example 1 to Example 3, Example 11, and Comparative Example 2 were indexed by setting the resultant values of Comparative Example 1 to 100, each of the resultant values of Example 4 to Example 6, Example 12, Comparative Example 4, and Comparative Example 5 were indexed by setting the resultant values of Comparative Example 3 to 100, and each of the resultant values of Example 7 to Example 10, Example 13, and Comparative Example 7 were indexed by setting the resultant values of Comparative Example 6 to 100.

3) Viscoelasticity Properties

The viscoelasticity properties were secured by measuring viscoelasticity behavior on thermodynamic deformation at each measurement temperature (−60° C.-60° C.) with a frequency of 10 Hz by using a dynamic mechanical analyzer (GABO Co.) in a film tension mode and securing a tan δ value. From the resultant values, if the index value of tan δ at a low temperature of 0° C. increases, wet skid resistance becomes better, and if the index value of tan δ at a high temperature of 60° C. increases, hysteresis loss decreases, and low running resistance (fuel consumption ratio) becomes better. In this case, each of the resultant values of Example 1 to Example 3, Example 11, and Comparative Example 2 were indexed by setting the resultant values of Comparative Example 1 to 100, each of the resultant values of Example 4 to Example 6, Example 12, Comparative Example 4 and Comparative Example 5 were indexed by setting the resultant values of Comparative Example 3 to 100, and each of the resultant values of Example 7 to Example 10, Example 13, and Comparative Example 7 were indexed by setting the resultant values of Comparative Example 6 to 100.

4) Processability Properties

By measuring the Mooney viscosity (MV, (ML 1+4, @100° C.) MU) of the secondary mixture compound obtained during 1) preparation of rubber specimen, the processability properties of each polymer was comparatively analyzed, and in this case, the lower the measured value of the moony viscosity is, the better the processability properties are.

Particularly, by using MV-2000 (Alpha Technologies Co.) using Large Rotor at a rotor speed of 2±0.02 rpm at 100° C., each secondary mixture compound was stood at room temperature (23±3° C.) for 30 minutes or more, and 27±3 g was collected and put in a die cavity, and then, Platen was operated for 4 minutes for measurement.

TABLE 4

| Division | | Example 1 | Example 2 | Example 3 | Example 11 | Comparative Example 1 | Comparative Example 2 |
|---|---|---|---|---|---|---|---|
| Tensile properties (Index) | Tensile strength (kgf/cm²) | 109 | 111 | 109 | 116 | 100 | 108 |
| | 300% modulus (kgf/cm²) | 115 | 116 | 113 | 121 | 100 | 108 |
| Viscoelasticity properties (Index) | tan δ (at 0° C.) | 100 | 103 | 100 | 101 | 100 | 99 |
| | tan δ (at 60° C.) | 119 | 125 | 115 | 116 | 100 | 107 |

TABLE 5

| Division | | Example 4 | Example 5 | Example 6 | Example 12 | Comparative Example 3 | Comparative Example 4 | Comparative Example 5 |
|---|---|---|---|---|---|---|---|---|
| Tensile properties (Index) | Tensile strength (kgf/cm²) | 110 | 111 | 108 | 116 | 100 | 107 | 108 |
| | 300% modulus (kgf/cm²) | 114 | 114 | 113 | 119 | 100 | 108 | 112 |
| Viscoelasticity properties (Index) | tan δ (at 0° C.) | 101 | 102 | 100 | 101 | 100 | 100 | 99 |
| | tan δ (at 0° C.) | 121 | 125 | 118 | 118 | 100 | 108 | 113 |
| | tan δ (at 60° C.) | 69 | 69 | 69 | — | 65 | 71 | 75 |

TABLE 6

| Division | | Example 7 | Example 8 | Example 9 | Example 10 | Example 13 | Comparative Example 6 | Comparative Example 7 |
|---|---|---|---|---|---|---|---|---|
| Tensile properties (Index) | Tensile strength (kgf/cm²) | 109 | 111 | 107 | 109 | 118 | 100 | 106 |
| | 300% modulus (kgf/cm²) | 109 | 110 | 107 | 110 | 121 | 100 | 107 |
| Viscoelasticity properties (Index) | tan δ (at 0° C.) | 101 | 105 | 100 | 100 | 101 | 100 | 99 |
| | tan δ (at 60° C.) | 116 | 122 | 113 | 116 | 113 | 100 | 107 |

As shown in Table 4 to Table 6, Example 1 to Example 13 according to exemplary embodiments of the present invention showed improved tensile properties, viscoelasticity properties and processability properties when compared to Comparative Example 1 to Comparative Example 7.

Meanwhile, with respect to the viscoelasticity properties, it is known very difficult that a tan δ value at 0° C. increases while a tan δ value at 60° C. increases at the same time. Accordingly, when compared to Comparative Example 1 to Comparative Example 7, Example 1 to Example 13 showing equal or better degree of a tan δ value at 0° C. and remarkably improved effect of a tan δ value at 60° C., had very excellent viscoelasticity properties.

Particularly, referring to Table 4, Example 1 to Example 3 and Example 11 showed largely improved tensile properties and remarkably increased viscoelasticity properties when compared to Comparative Example 1. Particularly, Example 1 to Example 3 and Example 11 showed largely improved tan δ values at 60° C. by 15% or more and equal or better degree of tan δ values at 0° C. when compared to Comparative Example 1. In addition, referring to Table. 5, Example 4 to Example 6 and Example 12 showed equal or better degree of processability, improved tensile properties, and largely improved viscoelasticity properties when compared to Comparative Example 3 to Comparative Example 4. Particularly, Example 4 to Example 6 and Example 12 showed largely improved tan δ values at 60° C. by 15% or more and equal or better degree of tan δ values at 0° C. when compared to Comparative Example 3.

Also, referring to Table 6, Example 7 to Example 9 and Example 10 showed largely improved tensile properties and remarkably improved viscoelasticity properties when compared to Comparative Example 6. Particularly, Example 1 to Example 3 and Example 11 showed largely improved tan δ values at 60° C. by 10% or more and equal or better degree of tan δ values at 0° C. when compared to Comparative Example 1.

The invention claimed is:

1. A modified conjugated diene-based polymer having:
a unimodal molecular weight distribution curve measured by gel permeation chromatography (GPC),
a molecular weight distribution of less than 1.7,
a Si content of 100 ppm or more based on a total weight of the modified conjugated diene-based polymer, wherein the Si content is measured by an inductively coupled plasma (ICP) analysis method, and
the modified conjugated diene-based polymer comprising a repeating unit derived from an aromatic vinyl monomer in an amount of greater than 0 wt% and less than 15 wt% based on the total weight of the modified conjugated diene-based polymer.

2. The modified conjugated diene-based polymer of claim 1 further comprising, a repeating unit derived from a conjugated diene-based monomer and a functional group derived from a modifier.

3. The modified conjugated diene-based polymer of claim 2, wherein the modifier has an affinity with silica.

4. The modified conjugated diene-based polymer of claim 1, wherein the modified conjugated diene-based polymer has a number average molecular weight (Mn) of 1,000 g/mol to 2,000,000 g/mol, and a weight average molecular weight (Mw) of 1,000 g/mol to 3,000,000 g/mol.

5. The modified conjugated diene-based polymer of claim 1, wherein the molecular weight distribution is from 1.0 to less than 1.7.

6. The modified conjugated diene-based polymer of claim 1, wherein a Mooney viscosity is 30 or more at 100° C.

7. A modified conjugated diene-based polymer having: a unimodal molecular weight distribution curve of a polymer component having a molecular weight of 100,000 g/mol or more measured by gel permeation chromatography (GPC) with polystyrene as a standard for calculating molecular weight,
a molecular weight distribution of 2.0 or less,
a number average molecular weight (Mn) of 250,000 g/mol to 700,000 g/mol,
a vinyl content of a butadiene unit of 20 mol% to 80 mol%,
a Si content of 100 ppm or more based on a total weight of the modified conjugated diene-based polymer, wherein the Si content is measured by an inductively coupled plasma (ICP) analysis method,
a content of the polymer component having a functional group of 50 wt% or more based on the total weight of the modified conjugated diene-based polymer, and
the modified conjugated diene-based polymer comprising a repeating unit derived from an aromatic vinyl monomer in an amount of greater than 0 wt% and less than 15 wt% based on the total weight of the modified conjugated diene-based polymer.

8. A rubber composition comprising the modified conjugated diene-based polymer according to claim 1, and a filler.

9. The rubber composition of claim 8, wherein the rubber composition comprises 0.1 parts by weight to 200 parts by weight of the filler based on 100 parts by weight of the modified conjugated diene-based polymer.

10. The rubber composition of claim 8, wherein the filler is a silica-based filler or a carbon black-based filler.

11. A rubber composition comprising the modified conjugated diene-based polymer according to claim 7, and a filler.

12. The rubber composition of claim 11, wherein the rubber composition comprises 0.1 parts by weight to 200 parts by weight of the filler based on 100 parts by weight of the modified conjugated diene-based polymer.

13. The modified conjugated diene-based polymer of claim 2 further comprising a repeating unit derived from a diene-based monomer of 1 to 10 carbon atoms in an amount greater than 0 wt% up to 1 wt% based on athe total weight of the modified conjugated diene-based polymer.

14. The modified conjugated diene-based polymer of claim 1, wherein the Si content is 100 ppm to 10,000 ppm based on the total weight of the modified conjugated diene-based polymer.

15. The modified conjugated diene-based polymer of claim 6, wherein the Mooney viscosity is 40 to 150 at 100° C.

16. The modified conjugated diene-based polymer of claim 3, wherein the modifier is an alkoxysilane-based modifier comprising one or more heteroatoms including a nitrogen atom, an oxygen atom, and a sulfur atom.

17. The rubber composition of claim 10 further comprising a silane coupling agent,
wherein the filler is a silica-based filler.

18. A method for preparing the modified conjugated diene-based polymer of claim 1 comprising:
(S1) polymerizing a conjugated diene-based monomer, or an aromatic vinyl-based monomer and a conjugated diene-based monomer, in a hydrocarbon solvent including an organometallic compound to prepare an active polymer; and
(S2) reacting the active polymer prepared in (S1) with a modifier,
wherein the active polymer is coupled with an organometal,
the step (S1) is continuously performed in two or more polymerization reactors, and
a polymerization conversion ratio in a first polymerization reactor is 50% or less.

19. The method according to claim 18, wherein the polymerization of step (S1) is conducted in a temperature range of 80° C. or less.

20. The method according to claim 18, wherein the modifier is an alkoxysilane-based modifier comprising one or more heteroatoms including a nitrogen atom, an oxygen atom, and a sulfur atom.

* * * * *